United States Patent [19]

Everett et al.

[11] Patent Number: 5,272,910
[45] Date of Patent: Dec. 28, 1993

[54] VADOSE ZONE MONITORING SYSTEM HAVING WICK LAYER ENHANCEMENT

[75] Inventors: Lorne G. Everett, Santa Barbara; John H. Kramer, Vallecito; Stephen J. Cullen, Santa Ynez, all of Calif.

[73] Assignee: The Regents of the University of California, Oakland, Calif.

[21] Appl. No.: 882,595

[22] Filed: May 13, 1992

[51] Int. Cl.$^5$ .................. G01M 3/04; G01N 23/00
[52] U.S. Cl. .................................. 73/40; 73/49.2; 588/260; 250/253; 250/390.05; 405/54; 405/55
[58] Field of Search .................. 73/40, 49.2; 405/129, 405/54, 50, 38, 55; 588/249, 260; 250/390.04, 390.05, 253

[56] References Cited

U.S. PATENT DOCUMENTS 5,155,356 10/1992 Peters et al. .................. 73/49.2 X

OTHER PUBLICATIONS

Kramer, John H. et al., "Proactive Post-Closure Vadoze Zone Monitoring Strategy Using Neutron Logs," GRCDA's 20th Annual Western Regional Solid Waste Management Symposium Apr. 1990.
Brose, Richard J. et al., "Neutron Monitoring in the Unsaturated Zone," LeRoy Crandall & Associates, May, 1986, pp. 455–467.
Bumb, Amar C. et al., "Design of Lysimeter Leak Detector Networks for Surface Impoundments and Landfills," Focus, Apr., 1988.
Kramer, John H., "Contamination Investigations Using Neutron Moderation in Grouted Holes—A New Cost-Effective Technique," Kendall/Hunt Publishing Co., Mar., 1990, pp. 234–242.
Frind, Emil O. et al., "Application of Unsaturated Flow Properties in the Design Geologic Environments for Radioactive Waste Storage Facilities," Department of Earth Sciences, Univ. of Waterloo, Ontario, Canada, Jun., 1977.
Yeh, C. Jim et al., "Stochastic Analysis of Unsaturated Flow in Heterogenous Soils," American Geophysical Union, Apr., 1985, pp. 465–471.

Primary Examiner—Hezron E. Williams
Assistant Examiner—Michael Brock
Attorney, Agent, or Firm—Pretty, Schroeder, Brueggemann & Clark

[57] ABSTRACT

A vadose zone monitoring system for detecting leaks from a contaminant storage facility or the like is disclosed in which leaks are detected in a confined radial area around at least one generally horizontal, neutron access tube disposed under the landfill. A wicking layer of material increases the leakage detection coverage area by laterally transmitting leakage to the access tube via capillary action. A clay liner may be disposed between the landfill and wicking layer for controlling the rate of leakage to prevent build-up of a pressure head large enough to force liquid through the wicking layer before it is conducted laterally to the access tube. Leak detection may be carried out by neutron moderation techniques or other moisture detection schemes for developing logs indicative of the leakage from the landfill. The wicking layer permits an entire network of access tubes or other leak detection means to be installed under substantially the entire landfill for monitoring leaks therefrom.

17 Claims, 4 Drawing Sheets

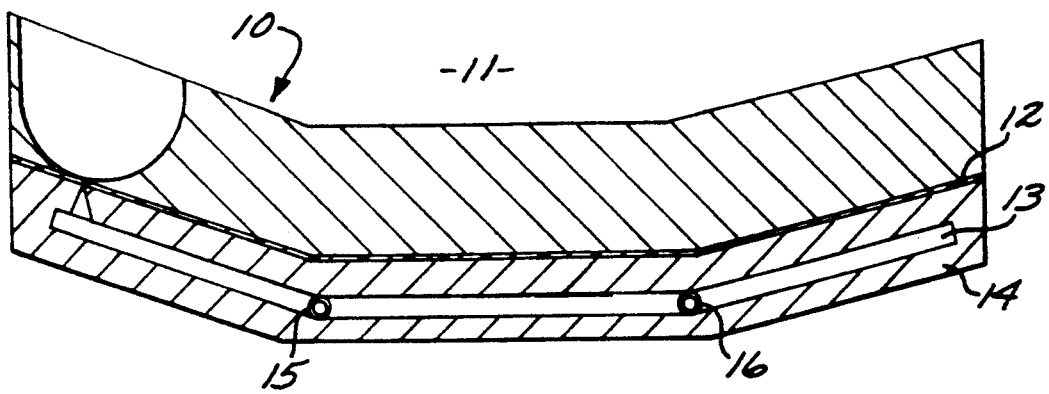
FIG.5
FIG.6
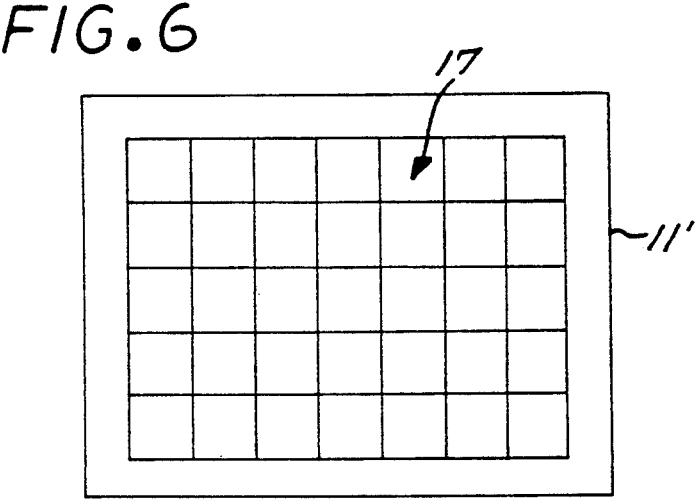
FIG.7
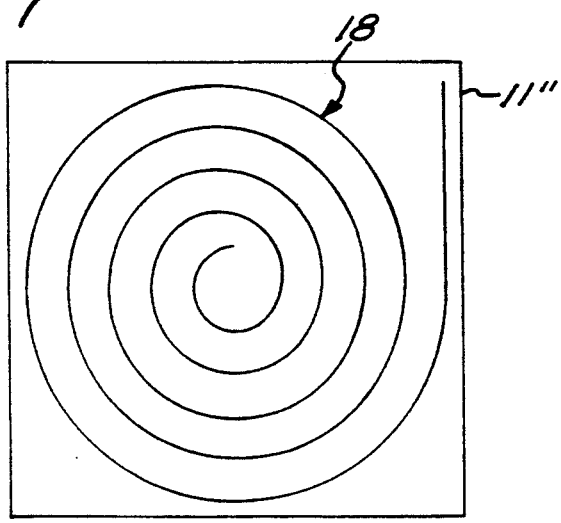

VADOSE ZONE MONITORING SYSTEM HAVING WICK LAYER ENHANCEMENT

This invention was made with Government support under Grant No. CR813350-01-0 awarded by the Environmental Protection Agency (EPA). The Government has certain rights in this invention.

BACKGROUND OF THE INVENTION

The invention relates generally to monitoring groundwater contamination and, more particularly, to a vadose zone monitoring system using horizontal access tubes and neutron moderation techniques for detecting leakage from waste management units ("WMU's") such as landfills or other sources of contaminants.

Before contaminants can enter the groundwater system they must first pass through the vadose zone, a complex intermediate zone between the surface and the permanent groundwater table. A relatively dry vadose zone acts like a sponge, holding liquids in pore and crack spaces. Therefore, the vadose zone is an important roadblock to contaminant transport in the subsurface and serves as an ideal milieux for the containment and isolation of contaminants until they can be rendered harmless or decompose. Outward flow of contaminants from the vadose zone can be eliminated by stopping the contaminant sources and surface infiltration because liquid mobility decreases at lower saturation percentage. Effective vadose zone monitoring, which detects contaminants and/or progressive saturation before groundwater is impacted, focuses efforts on contamination reduction rather than remediation.

Currently employed vadose zone monitoring systems provide incomplete assessments of the vadose zone. The limitations and drawbacks of commonly employed vadose zone monitoring systems are discussed below.

Direct pore liquid sampling by vacuum lysimetry is by far the most commonly employed vadose zone monitoring strategy. This and other techniques of pore-liquid sampling have been thoroughly described in the literature. Lysimeters provide direct chemical confirmation of the presence or absence of contaminants if soil tensions are in their effective operating range (0–65 char), and indirect evidence if not. If the soils are too dry to collect a lysimeter sample, they are also too dry for contaminant migration. The most severe limitation of this method is the sampling radius. The sampling radius is dependent upon the surrounding soil system, its moisture content and the time between sampling events. Previous work by others indicates network spacing of 7 to 17 feet for a variety of appropriate soils and leak rates.

Comprehensive lysimeter network design is rarely achieved in practice because it requires a large number of sampler installations, which is prohibitively expensive. For example, complete coverage of a forty acre site would require 6,000 to 35,000 samplers. Aside from installation costs, the annual costs for chemical analyses to satisfy a typical monitoring order in the state of California would be $20 million. In practice, a typical lysimeter network for a forty acre landfill might have a total of five samplers at depths of 2 to 100 meters. Liquid sampling systems therefor represent spot checks of liquid movement in the vadose zone.

The importance of moisture front detection is apparent from FIG. 1 which shows a plot of unsaturated hydraulic conductivity ($K_u$) of a clay material as a function of moisture content. Note that an exponential rise in $K_u$ occurs throughout the upper 50% of saturation percentage. A typical clay liner is installed at approximately 30% volumetric water content (water content by wt. of approximately 16%). At these water contents $K_u$ is orders of magnitude less than the already low saturated hydraulic conductivity ($K_s$) for this material. Monitoring soil moisture through this interval identifies when $K_u$ is increasing rapidly, which is also when contaminants become mobile.

The same logic applies to poorly graded coarse material with a distinct air entry pressure, such as sand. Increases in $K_u$ in these materials is accompanied by large increases in water content. Unfortunately, they also drain very rapidly and unless measuring events are continuous, frequent, or timed to coincide with probable leak events, e.g., after heavy rains, leaks may pass undetected through these materials. Most soils are texturally intermediate in which moisture changes in response to leak events will be more gradual than sands.

The construction of new WMUs has provided opportunities to proact to environmental problems by planning for vadose zone monitoring at the inception of new facility design. Most sampling strategies employ the concepts of compliance points which must be periodically monitored for specified contaminants. Compliance points, originally conceived for groundwater monitoring, usually define a vertical plane down gradient from the WMU. The predominately vertical flow in the vadose zone makes it preferable to choose points directly beneath the facilities which define a horizontal plane. This is rarely done unless the vadose zone monitoring system can be planned during construction of the facility.

The strategic placement of horizontal access tubes, laid down like pipe beneath the WMU before construction, permits indirect pore liquid monitoring through geophysical techniques such as neutron moderation logging discussed in detail below. The resulting logs are line samples, a considerable improvement in coverage over the point sampling strategy described above. Logs of moisture content along these transects detect and locate potential leachate leaks, directly beneath the WMU. (Example logs are shown in FIGS. 3–4 discussed below). Chemical confirmation can be obtained from soil gas or pore liquid samplers retrofitted to specific problem areas. This results in a more judicious use of liquid samplers and chemical analyses than otherwise possible. Thus space and time coverage can be enhanced by monitoring the pore liquid content beneath the facility rather than just the chemistry of pore liquids.

Despite the improved coverage provided by horizontal access tubes, comprehensive coverage beneath WMUs has not yet been attained by these techniques. Borehole geophysical logging has a limited radius of investigation, usually less than 70 cm, although experimental techniques such as cross hole resistivity are under investigation to extend this range. For example, the neutron probe system described below measures a maximum cylinder of radius approximately 65 cm in dry sandy material and much less in wetter soils. Complete coverage under optimum homogeneous conditions would require a tight network of tubes 130 cm on center or less. This corresponds to providing tubes spaced no more than 260 cm apart. As with the lysimeter network design, complete coverage of a WMU using horizontal tubes is commercially unfeasible due to exorbitant cost.

Neutron moderation logging has been used to indicate the moisture content of soil surrounding the horizontal access tubes through the use of a neutron probe movably disposed inside the tube. Neutron moisture logging uses the neutron moderation technique, in which fast neutrons emitted from a neutron source in the probe, such as Americium 241/Beryllium through the tube and into the test material, which comprises the soil surrounding the tube, where the neutrons collide elastically with atoms. A detector also disposed in the probe is responsive to slow or thermalized neutrons only. The mass of most elements greatly exceeds the mass of fast neutrons so that these collisions result in little measurable loss of momentum from the fast neutron. It takes hundreds of such collisions to decelerate a fast neutron to its slow or thermalized state. Hydrogen, however, has a mass identical to that of the fast neutron, which means that collisions with hydrogen will result in a significant transfer of velocity from the fast neutron. It takes only about 20 such collisions to thermalize a fast neutron. The detector counts the number of thermalized neutrons it receives over a given time period. These counts can be correlated directly with hydrogen concentrations since the probability that the thermalized neutrons are the result of collisions with hydrogen is much greater than the probability that they are from other collisions. This is a measure of pore liquid volume, since the most common source of hydrogen in the geologic environment is pore liquids.

Commercially available moisture probes measure the hydrogen density in a spherical volume around the probe which can be integrated along an access tube for a cylindrical sample of radius 15 to 65 cm. This translates to real advantages over direct pore liquid sampling, which requires periodic sampling, usually quarterly, with delay time between sample collection and analytical results, point samples with limited lateral coverage, and large sampling budgets.

Neutron moderation is a well documented technology developed for measuring the volumetric moisture content of soils. It has been used to track wetting fronts in the vadose zone and recently has been applied to vadose zone monitoring at WMUs. Testing at a hazardous waste facility clearly has shown elevated neutron counts in response to a simulated leak. It has been a proven technique to detect hydrocarbon liquids, as well as water, and has therefore been proposed as an important component of new multiplexing monitoring strategies. The applicability of the technique to numerous groundwater monitoring wells, not originally designed for vadose zone monitoring, has been demonstrated in the laboratory where the masking effects of grouts and casings did not preclude the detection of wetting fronts in and regimes. This permits the use of neutron logging in piezometers and monitoring wells to track infiltration and map perched water horizons, which may produce false positives in horizontal access tubes beneath facilities.

Horizontal access tubes have been applied to several sites to provide vadose zone monitoring systems at the inception of a new facility. One such a site is for waste water ponds located in the Mojave Desert area. Ten horizontal access tubes 263 meters long were used in conjunction with vertical well logging to obtain a three dimensional picture of the moisture content beneath the ponds. A second application is at a new Class I California landfill where four horizontal access tubes (213 meters) were installed beneath the leachate sump during construction. Example logs from this site are shown in FIG. 4. At these sites logging is performed by manually deploying the probes through the tubes on a regular schedule, which requires significant man hours.

Calaveras County, California has constructed a new landfill facility that incorporates a vadose zone monitoring system having a neutron access tube disposed beneath the swale, leachate pipeline and pond as shown in FIGS. 2a, 2b. The neutron monitoring system includes an access tube of 4" inner diameter, high density polyethylene (HDPE) buried a foot below the overbuilt clay liner beneath the leachate recovery system as shown in FIG. 2b. The access tube was graded to drain to avoid ponding of condensate or other water, and perforated to allow the entrance of soil gas. The neutron probe used was manually operable and adapted to transmit its measurements over the full length of deployed cable. The cable contained several conductors and a slip ring connector at the spool. Initial neutron logs showing the results of monitoring events at this site are shown in FIG. 3.

The disadvantages of neutron probe monitoring have been discussed in the literature and include a limited cylinder of investigation (typical radius of 5-64 cm), measurement of only volumetric changes in pore fluid and therefore insensitivity to steady state flow, and lack of chemical data. The foregoing review indicates that the need for a commercially feasible, vadose zone monitoring system for detecting contaminant leaks from substantially all areas of a WMU has not been met. No such designs for complete coverage of an entire landfill exist at this time. The systems in use place the horizontal access tubes beneath areas likely to pond leachate, such as sumps and leachate collection systems.

SUMMARY OF THE INVENTION

The invention meets this need and avoids the disadvantages of neutron probe monitoring by providing a wicking layer of material within which the horizontal access tubes or other leak detection means are disposed to increase the lateral sensitivity of the means. Soil tension, which is dependent upon pore size distribution and saturation percentage, is greater in fine grained materials, such as clay, silt and diatomaceous earth, natural fibers such as cotton, and synthetic fabric. When forming the wicking layer from these or similar materials, the lateral wicking of moisture with time gradually draws pore liquid from distances considerably greater than the normal operating radius of the neutron probe. This shows up as a gradual yet distinct rise in pore fluid content indicating a leak at some distance from the probe. Care must be taken to distinguish such a rise caused by a leak from a seasonal re-equilibration of moisture content. This requires a good understanding of the site hydrogeology, depth to groundwater, height of capillary rise, and seasonal water table fluctuations.

It is envisioned that with the wicking layer of the invention, the tube spacing can increase at least 3 times over the current maximum 260 cm spacing. At present, it is estimated that the maximum attainable spacing with the invention may be as high as 50 times the current maximum 260 cm spacing. Thus, with the invention, effective access tube spacing may be approximately 7 meters or more apart, thereby permitting the use of a network of horizontal access tubes disposed substantially underneath the entire WMU for monitoring leaks in a commercially feasible manner from all areas, not just those deemed most likely to leak.

The invention solves the problem of neutron logging being insensitive to steady state flow from contaminant leaks through proper record keeping and a good understanding of the soil moisture regime of the facility. If thorough pre-use monitoring is accomplished and soils are below field capacity at the onset of facility use, leaks will be evidenced by measurable moisture increases. Unsaturated flow in a clay liner will be extremely slow until moisture levels rise to near-saturation. For a typical clay liner 5 meters or so above the water table, an increase in moisture content of approximately 30 volume percent can be expected. These types of increases are detectable by neutron probe measurements. Calibrations of neutron probes in uncased large diameter boreholes and in experiments through simulated grouted wells indicate a sensitivity to change on the order of 10–14 volume percent (assuming dry density of 1.77 g/cc). Sensitivity to changes of 3.5% or less is detected at the 95% confidence level in agricultural studies using more frequent sampling in narrow access tubes. Thus, it is likely that with numerous sampling events and a stable background, such as would be found beneath an infiltration protected WMU, significant moisture fronts are detectable.

Finally, the lack of chemical data problem may be solved by using downhole techniques to perforate the tube once a leak is detected. Should a suspected leak be detected, the first confirmation of leachate presence would be from volatile organic compounds, a common constituent of paint products and household wastes. Should these not be present, and a leak suspected, a suction lysimeter can be drilled into place to intercept and sample the suspected leachate plume. As an alternate to retrofit drilling of lysimeters, the access tube may be converted into a lysimeter in the region of a suspected leak, or the pipe may be perforated to sample the pore liquid with a wick sampler. By waiting until the probe locates a likely leak before installing a sampler, the hit-or-miss drawback from point sampling is removed and sampling resources may be effectively allocated.

The invention also contemplates the use of an automated logging system and dedicated neutron probe as a reasonable logging protocol to avoid excessive operator time for an entire network of access tubes disposed under substantially the entire WMU.

Further, although the invention is described in connection with neutron probe moisture detection techniques, it is apparent that the wicking layer of the invention has applicability to other types of moisture detection schemes, such as frequency-domain capacitance, induced resistivity, and time-domain reflectometry techniques.

BRIEF DESCRIPTION OF THE DRAWINGS

FIG. 5 is a cross-section of a vadose zone monitoring system illustrating the principles of the invention.

FIG. 6 is a plan view of a landfill having a vadose zone monitoring system constructed according to the principles of the invention schematically illustrating a grid-like array of neutron access tubes.

FIG. 7 is a schematic plan view similar to FIG. 6 illustrating a spiral configuration of neutron access tubes.

DETAILED DESCRIPTION

Figure 1:
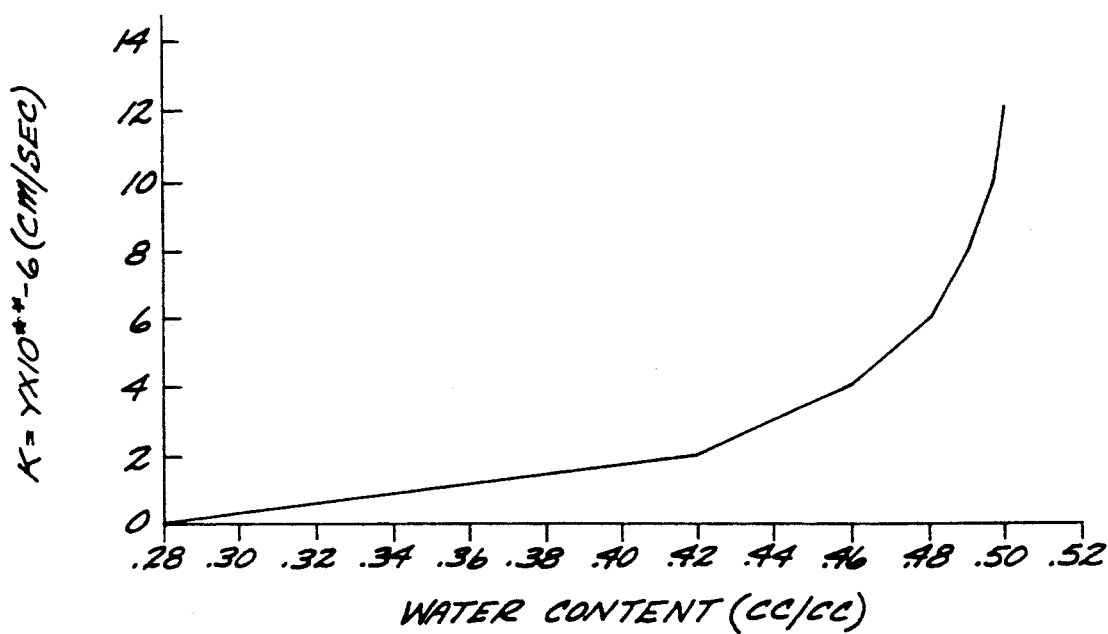
FIG. 1 is a prior art graph showing the relationship of unsaturated hydraulic conductivity as a function of volumetric moisture for a clay material.
Figure 2A:
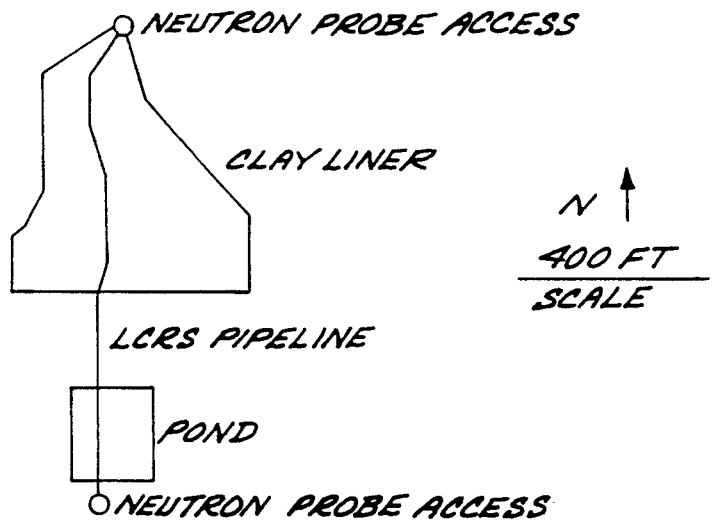
FIG. 2a is a plan view of a landfill having a neutron access tube for detecting leaks from a Leachate Collection and Retrieval System (LCRS).
Figure 2B:
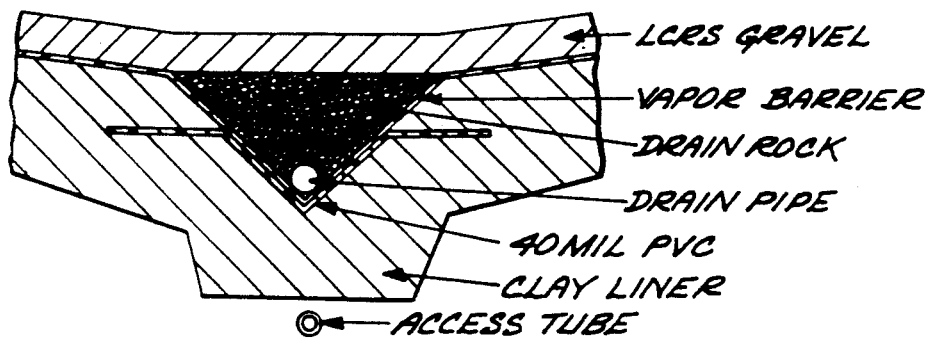
FIG. 2b is a cross-section of the leachate collection and retrieval system shown in FIG. 2a illustrating the location of the neutron access tube below the LCRS.

The cross section shown in FIG. 5 illustrates how the engineering controls of the invention are used to increase the spacing of horizontal access tubes and thereby provide an efficient, economically feasible system capable of providing complete monitoring coverage of a WMU. Without the invention, complete coverage under optimum homogenous conditions would require a tight network of tubes spaced about 260 cm apart, whereas with the invention it is contemplated that the tubes may be spaced approximately 7–130 meters apart.

As evident from FIG. 5, the vadose zone monitoring system 10 of the invention provides substantially complete coverage for detecting leaks from a landfill 11 or other source of liquid contaminants before contamination of groundwater occurs. The monitoring system 10 comprises a clay liner 12 disposed immediately below the landfill and a wicking layer 13 surrounded by a coarse sand layer 14, having particle sizes in the range of 0.1–2 mm, disposed below the clay liner 12. Generally horizontal, neutron access tubes 15, 16 are spaced from each other and disposed in the wicking layer.

The wicking action of layer 13 of fine grained material, having particle sizes less than 0.01 mm, dominates over vertical flow at low moisture contents, thereby extending the range of the tubes by drawing liquid to them. The wicking layer 13 may be formed of clay, silt, diatomaceous earth, natural fibers such as cotton, or synthetic fabric, surrounded by coarse sands 14. The coarse sands act as an unsaturated flow boundary to halt outward movement of leaking liquid from beneath the clay liner 12 and to protect the wicking layer from moisture from below or from the sides. A leak is shown at the left side of FIG. 5. When the leaking liquid builds up to nearly atmospheric pressure, it will drip out of the clay liner 12 into the sand 14 immediately below the leak. The dripping liquid will pass through the sand to the wicking layer 13. This layer is designed to transmit liquid laterally to the neutron access tubes 15, 16 before transmitting liquid through the layer.

The clay liner 12 modulates or controls the flow of the infiltrating, vertically leaking liquid, to prevent the creation of a driving head on top of the wicking layer that would push liquid through the wicking layer before it is drawn to the access tube by capillarity.

Although the invention is illustrated with neutron probes serving as the moisture detection means, alternate detection schemes may be employed such as those using the principles of frequency domain capacitance, induced resistivity, or time-domain reflectometry. If neutron probes are employed, commercially available probes such as the HYDRO-PROBE TM made by Campbell Pacific or probes made by Troxler Electronics, which have radioactive neutron sources, are presently preferred. Of course, probes with non-radioactive sources may be used as well.

Mechanization of the probes provide real advantages to a neutron probe strategy, especially when a large network of probes is used. It simplifies the monitoring task for the landfill operator, permitting technicians with minimal training to record logs, allowing more frequent and thorough sampling than would otherwise be possible, and eliminating human and transcription errors. Three components for mechanized or automated probe operation are required: (1) a probe deployment system (2) neutron probes, and (3) a data acquisition and management system.

Probe deployment may be carried out by a computerized winch and cable, which moves the probe through the tube, with an optical interrupt switch provided on a measuring wheel to control stopping. A signal from a computer control system may be used to advance the probe to the next station. Problems with cable abrasion are anticipated over the life of the system (70 years). Cable abrasion may be addressed via the use of intrapipe carts, such as an inchworm device that advances along the sides of the pipe using outward pressure, small tractors using rubber bulldozer - like tracks, a compressed air driven parachute device controlled by a restraining tether, or a tram-like cart that advances along a fixed cable, which threads through drive wheels much like the arrangement at a ski-lift.

The access tubes may be formed from high density polyethylene (HDPE) or other materials, such as stainless steel, which are tough and resist corrosion. The low cost per sampling event attainable by the automated-dedicated neutron probe system of the invention permits frequent monitoring responsive to changing conditions, such as seasonal moisture increases or developing leaks.

The neutron probe access tubes or other leak detection means may be employed in a variety of arrangements to cover substantially the entire area under the WMU. For instance, the tubes may be arranged in parallel or in an array spaced in a grid-like manner as shown schematically in the plan view of FIG. 6 at 17. The tubes may lie in a common horizontal plane or may follow the contour of the WMU and lie in intersecting horizontal planes. Alternatively, as shown schematically in the plan view of FIG. 7 at 18, the tubes may be arranged in a spiral arrangement under the landfill, again in a common or intersecting horizontal planes.

Similarly, the wicking layer, instead of being a sheet of material as discussed above, may be employed in a variety of spatial arrangements, such as parallel rows, a grid-like array, or a spiral. Again, the wicking layer would draw fluids towards the moisture detection means, which would not need to be spread underneath substantially the entire facility. With such a wicking layer arrangement, fewer moisture detection means could be provided without sacrificing the ability to provide leakage detection coverage for the entire facility.

Initial logging work should be done at the site to establish site specific logging schedules related to fluctuations in background moisture and measurement variability. Once an appropriate sampling protocol is established, each new monitoring event should be compared to background. Repeated measurements and parametric statistics should be employed to distinguish counts significantly different from stable background. Non-anomalous measurements should be rolled into the background population to improve counting statistics.

Figure 4:
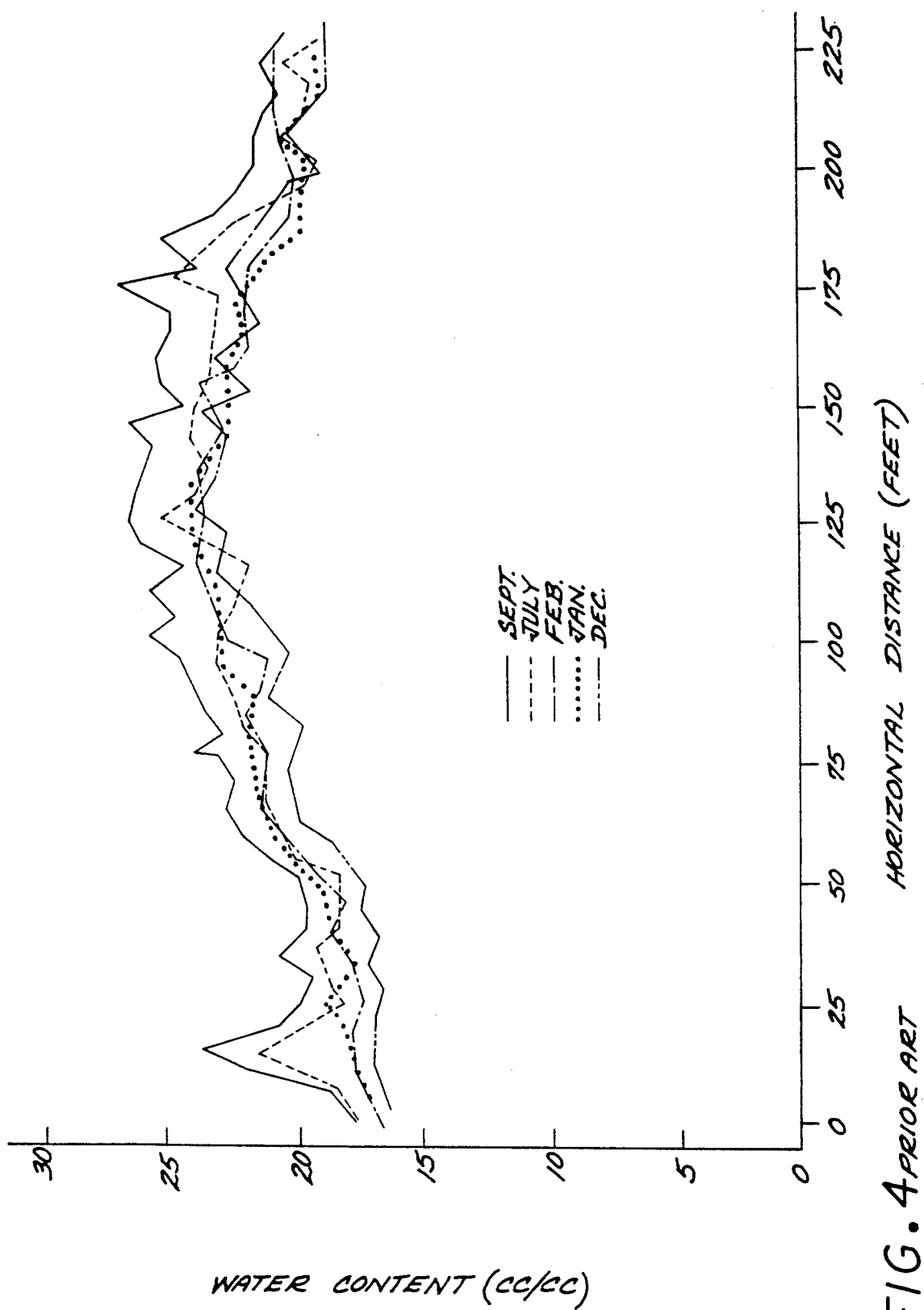

Condensation on the inside of the pipe may cause false positives. Pipes should be graded to drain wherever feasible and supplied with sump cleanouts where not. Such a condensate false positive is recorded in logs from the horizontal monitoring system depicted in FIG. 4.

A series of moderated neutron counts at a given position is a measure of relative changes of hydrogen density, proportional to changes in soil moisture. These can be used as a direct comparison to evaluate the potential for fluid movement without quantitative calibration. Significant changes in neutron counts can be determined relative to the precision of the technique using subsampling populations and parametric statistic such as the Student's T statistic. It is possible that statistically insignificant neutron count changes could represent a moisture increase from a leak. For this reason the system may not be effective in humid settings with poorly graded soils where small changes in moisture content could result in significant rapid movement of pore liquids.

Figure 3:
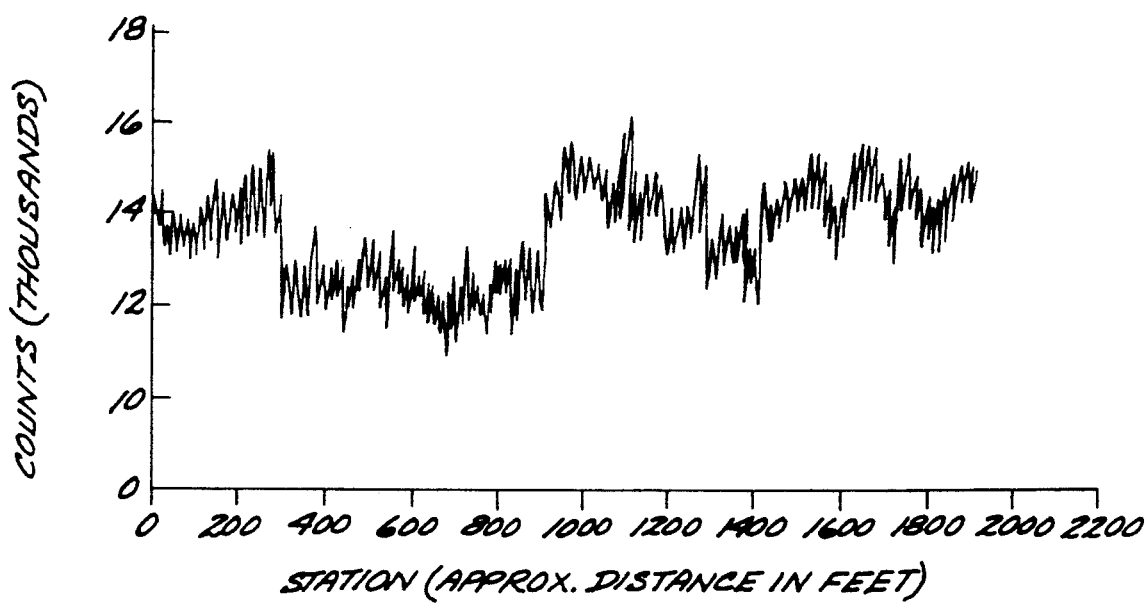
FIGS. 3–4 show neutron log graphs taken from monitoring events at landfills.

Quantitative calibration could be useful for predicting moisture content thresholds above which liquids would commence significant movement or for mathematical modelling. However, the spatial variability in soil moisture along horizontal access tubes displayed in FIGS. 3 and 4, predictable from prior field studies, means that each station has unique soil properties and should have its own calibration. This can be accomplished during construction, when numerous gravimetric samples can be collected at each station as the access tube is buried. Assuming the initial conditions are below field capacity, these will yield a low end calibration point. The only way to obtain a corresponding wet end calibration point is (1) by field saturating the system, (2) by laboratory calibration, or (3) by a field test pad. Field saturating the system would destroy its sorptivity and limit future wetting front sensitivity. Laboratory calibration would be difficult because the high compactive effort used in landfill liner construction would be hard to duplicate. The field test pad method could be implemented during liner construction, would best simulate the variability from station to station and should indicate the magnitude of changes to be expected from a leakinduced wetting front, but would not recreate the conditions at each station.

False positives from natural events, such as perched water movement into the system sampling area must be ruled out using geologic evidence. In this case pre-use monitoring history is useful to identify preferred pathways of vadose zone flow and to define lag times between rain events and high moisture readings.

Seasonal background fluctuations should be considered in areas where rainfall is concentrated during one part of the year. It may be necessary to adjust background to reflect this.

What is claimed is:

1. A vadose zone monitoring system for detecting leaks from a source of liquid contaminants comprising:
    means for detecting the moisture concentration at a predetermined vertical location underneath a liquid contaminant source;
    a first wicking layer of material within which said moisture detecting means is disposed for transmitting liquid laterally to said moisture detecting means by capillary action before the liquid passes through the wicking layer;
    a second layer of material, disposed between the source of contaminants and said wicking layer, for controlling the rate of leakage into the wicking layer to prevent development of a pressure head tending to force liquid through the wicking layer prior to being drawn to said moisture detecting means.

2. The system of claim 1 further comprising a third unsaturated flow boundary layer disposed around the wicking layer for retarding the flow of liquid from the second layer and protecting the wicking layer from moisture from below.

3. The system of claim 2 wherein said third layer comprises sand.

4. The system of claim 1 wherein said first wicking layer comprises at least one material selected from the group consisting of clay, silt, diatomaceous earth, natural fibers and synthetic fabric.

5. The system of claim 1 wherein said second layer comprises a clay liner.

6. The system of claim 1 wherein said moisture detection means comprises at least one generally horizontal access tube and means for detecting the concentration of hydrogen atoms in a predetermined vertical location around said moisture detecting means.

7. The system of claim 6 wherein said moisture detection means comprises a neutron probe movable through said at least one tube, said probe having a neutron source continuously emitting fast neutrons and a neutron detector responsive solely to thermalized neutrons, whereby the number of thermalized neutrons sensed by the neutron detector in a given time period is directly related to hydrogen atom concentration in a predetermined space around the tube and usable to create neutron moderation logs indicative of the amount of leakage from the source of contaminants.

8. The system of claim 7 wherein the neutron source is radioactive.

9. The system of claim 7 wherein the neutron source is non-radioactive.

10. The system of claim 6 wherein said at least one generally horizontal access tube comprises two tubes having spaced longitudinal axes, and wherein said wicking layer transmits leakage to the tubes in a direction transverse to the longitudinal axes.

11. The system of claim 6 wherein said at least one generally horizontal tube comprises a plurality of tube sections forming a generally spiral shape disposed underneath substantially the entire source of liquid contaminants.

12. The system of claim 6 wherein said at least one generally horizontal tube comprises an array of parallel tubes disposed underneath substantially the entire source of liquid contaminants.

13. A method of monitoring the vadose zone underneath a source of liquid contaminants for leakage in which at least one means for detecting moisture is provided at a predetermined vertical position underneath the contaminant source, comprising the steps of:
  detecting the moisture concentration from an access tube at the predetermined vertical position;
  transmitting leakage from the contaminant source laterally to the access tube by capillary action before allowing the leakage to pass vertically below the moisture detecting means; and
  controlling the rate of leakage from the contaminant source prior to transmitting leakage laterally by capillary action to prevent development of a pressure head large enough to force leakage past the moisture detecting means.

14. A method of making a contaminant storage facility having a vadose zone monitoring system comprising the steps of:
  providing means for detecting moisture content at a predetermined vertical position underneath the facility;
  installing the moisture detecting means in a first wicking layer of material disposed underneath the facility for transmitting leakage from the facility laterally to the moisture detecting means by capillary action; and
  providing a second layer of material between the facility and the wicking layer for controlling the rate of leakage from the facility to prevent development of a pressure head large enough to force leakage through the wicking layer prior to being drawn to the moisture detecting means.

15. The method of claim 14 further comprising the step of disposing the wicking layer in a third unsaturated flow boundary layer for retarding the flow of liquid from the second layer and protecting the wicking layer from moisture from below.

16. The method of claim 15 wherein the first layer comprises at least one material selected from the group consisting of clay, silt, diatomaceous earth, natural fibers, and synthetic fabric, the second layer comprises a clay liner, and the third layer comprises sand disposed between the first and second layers, and below the first layer.

17. The method of claim 15 wherein the step of providing moisture detection means comprises providing enough neutron probe access tubes to substantially cover the entire area underneath the landfill.

* * * * *